United States Patent [19]

Tadiello

[11] Patent Number: 4,696,874
[45] Date of Patent: Sep. 29, 1987

[54] PLUG FOR CELLS OF ELECTRICAL STORAGE BATTERIES

[75] Inventor: Mario Tadiello, Cassano d'Adda, Italy

[73] Assignee: La Batteria di M. Tadiello S.r.l., Cassano d'Adda, Italy

[21] Appl. No.: 877,300

[22] Filed: Jun. 23, 1986

[30] Foreign Application Priority Data

Jul. 3, 1985 [IT] Italy ................. 21425 A/85
May 2, 1986 [IT] Italy ................. 20284 A/86

[51] Int. Cl.$^4$ ............................................. H01M 2/36
[52] U.S. Cl. ........................................ 429/64; 429/73; 429/74; 429/76; 141/199
[58] Field of Search ................. 429/72, 73, 74, 75, 429/76, 79, 85, 64, 53; 141/198–205, 303, 309; 73/448

[56] References Cited

U.S. PATENT DOCUMENTS 2,141,079  12/1938  Bolich ........................ 429/73 X
3,132,663   5/1964  Abbott ....................... 141/198 X
3,911,972  10/1975  Hubers et al. ............... 429/74 X
4,165,769   8/1979  Hoffmann .................... 141/198
4,386,141   5/1983  Weidner et al. ............... 429/64
4,527,593   7/1985  Campau ...................... 141/198 X Primary Examiner—Anthony Skapars
Attorney, Agent, or Firm—Bucknam & Archer

[57] ABSTRACT

Plug for cells of electrical storage batteries comprising a cylindrical body (4), fastened to the vent stack (2) of the cover, capable of being connected by two pipes (7) to the immediately preceding and to the immediately following plug, and provided with two parallel cylindrical cavities (14 and 16): one central cavity (14), in the interior of which a toothed hollow stem (10) of a float (11) slides; and one lateral cavity (16), in the interior of which a smaller rod (17), which is also toothed, slides, on which a heavy metal sphere (18) rests. The stem (10) and the rod (17) are constrained to the two arms of a rocker lever (23) hinged on a pin (22) in the lower hollow portion (20) of the body (4). When the float (11) and its hollow stem (10) move upwardly, the rod (17) and the sphere (18) move downwardly. When the electrolyte is at its right level, the sphere (18) rests on a ring (19) and closes the access of filling-up water to the cavity (16) housing the rod (17). A cover (8) closes, not tightly, the end of the hollow stem (10). As an alternative, this end can be tightly sealed, and a cylindrical sleeve of hydrophobic microporous ceramic (33) bounds laterally this end, to allow escape of gases.

10 Claims, 7 Drawing Figures

PLUG FOR CELLS OF ELECTRICAL STORAGE BATTERIES

BACKGROUND OF THE INVENTION

1. Field of the Invention

The present invention relates to a plug for cells of electrical storage batteries.

In particular, the present invention relates to a plug for cells of electrical storage batteries, particularly suitable for industrial lead/acid storage batteries, with centralized inseries self-levelling of the electrolyte, with independent gas vent for each cell, with pressure-retention of filling-up water and with the possibility of immediate optical check.

2. Description of the Prior Art

It is known that the cells of any electrical storage battery consume a certain amount of water, both because of water dissociation related to the loss in charge efficiency, and the entrainment by the gases during the overcharging period, as well as due to evaporation, in particular in industrial storage batteries, for instance for automotive uses, because they undergo intense daily, or even more frequent, charging and discharging cycles, with rather high operating temperature.

As each storage battery contains a rather high number of cells, the maintenance of the right electrolyte level in each cell requires a great deal of care this operation being essential to the purpose of maintaining at the correct value the density or concentration of active electrolyte, in particular of sulphuric acid, in the case of the most widely used storage batteries, the so-called "lead/acid" type. Thus it has not been easy to accomplish this object and, anyway a considerable time waste and hence a high cost has been involved.

Furthermore, the vent stacks of the cells not always can be easily reached and it is even less easy to inspect them, so that a correct levelling is an operation difficult to be performed from the technical viewpoint. On the other hand, an incorrect levelling of the electrolyte causes decreases of unpredictable seriousness in storage battery life, whether the electrolyte level decreases under the upper edge of the plates, or the excess of electrolyte overflows on the covers and enters the containing boxes, creating insulation losses, corrosions of the vehicle and the floors, and rendering completely unbalanced the capacity ratio of the individual cells.

The seriousness of the problem, not always correctly realized by the user, has induced the manufacturers of electrical storage batteries to study automatic levelling systems. So, numerous types of plugs for cells of electrical storage batteries have been proposed, but none of them has allowed the problem to be overcome to a complete and satisfactory extent.

Among the various solutions proposed, we mention the automatic, individual, portable filling-up devices, connected to the water supply system or to the reservoir of distilled water, which can flow through the vent stack of the individual cell until one of the various shutting systems, actuated by the electrolyte level, discontinues the feed when the desired level is reached.

This levelling system allows the errors of excessive, too low, or different levelling to be eliminated with a considerable technical advantage, but does not overcome the difficulty which is met in reaching many vent stacks, which can be positioned in even inaccessible places, without removing the storage battery, nor does it anyway overcome inconveniences, time waste and related increase of operation cost.

Also various types of centralized self-levelling plugs are known, in which the distilled water supply is connected to an end of one of the plugs, each plug being then connected in series or in parallel to all other plugs.

For such a system to operate perfectly a sensor of electrolyte level is required, which should be capable of shutting the feed bores leading to each individual cell, and which can lead water to the subsequent cell, as soon as the correct level is reached.

The various types of centralized self-levelling filling-up devices of the prior art can be subdivided mainly into two categories: plugs requiring tight cells, for which the feed pipe is also the vent pipe for the (potentially explosive) gases produced inside the cells, and plugs which do not require tightness, so that gases can escape to the outside from each individual cell.

Plugs belonging to the first category, in which the shutting occurs due to water surface tension, have the advantage of not containing moving parts, but are affected by the serious hazard that the electrical storage battery or a set of the cells may behave as one single explosion chamber in case of sparking, which is particularly dangerous if occurring inside the cell.

The plugs of the second category comprise some types in which the level-sensing element, which causes the feed to be discontinued, is constituted by a very small difference in electrolyte level which occurs in the interior of the feed plug when the correct level is reached, and which balances a small difference in level in the interior of the supply reservoir positioned at that time above the storage battery. This system is very delicate, and involves moving the water reservoir each time the storage battery must be charged, Other plug types known in the prior art exploit the technique of floats, the rising of which closes, by a pin, a small feed bore, which can extend in a vertical and/or in a horizontal position. Fastened to the float, an optical signalling means is installed, which consists of the head of a small rod, or of a small disc on a lever, which becomes visible on the plug surface, when the electrolyte level reaches its correct value. Around the moving elements the gas flows towards the outside, and inside a cavity, provided laterally to the float-controlled rod, a guard hole is provided, often in a very inconvenient place. However, in all these types, it is the small thrust, applied by the float, which retains the pin inside the feed nozzle; such an arrangement involves considerable risks of insufficient tightness, both due to manufacturing defects, and because of the occurrence of small deposits of debris arising from the breakdown of the plates, due to entrainment by the evolving gases.

SUMMARY OF THE INVENTION

The present invention solves the problem of the centralized filling-up by providing a plug having a central duct, inside which the stem of a float slides, and in which the gases flow to the outside from the central portion of each individual cell, so that a quick dispersion of hydrogen, cause of the explosions, is obtained.

For this purpose, the float stem is hollow throughout its length, and its diameter is such as to allow check means (densimeter, thermometer and so forth) to be inserted into it. The only cover is constituted by a light elastic plug provided at the end of the stem. The body of the plug is fastened to the vent stack of storage battery cover by any means, preferably by a smooth cylindrical coupling with sealing by rubber rings of the O-ring type.

The float causes, during its excursions, which occur in the centre and lengthwise through the plug body, the movement of a small stem along a lateral duct, parallel to the central duct. This lateral duct extends from the lower face, exposed to the electrolyte, of the plug, to the upper face; it is surrounded in correspondence of its upper end by a sealing elastic element (e.g., a sealing ring), and leads to a small cylindrical, closed chamber, from which the two pipes for the feeding and the discharge of filling-up water branch off. Inside this small chamber a heavy sphere (e.g., of stainless steel) slides, supported by this stem, and resting on the elastic sealing element, shutting the passage through the lateral duct.

The central stem of the float and the thrust stem are linked to each other at the ends of a rocker lever, hinged inside the hollow body of the plug, so that when the hfloat stem runs downwards (due to a lack of electrolyte), the sphere-bearing rod moves upwards, clearing the seat of the lateral duct mouth. Upon the occurrence of such a condition, filling-up water can flow downwards. On the contrary, when the float stem runs upwards, the small rod moves downwards, to let the sphere come to rest on the sealing elastic element.

In this condition, water cannot flow downwards any longer and the pressure inside the chamber increases, if required, up to the value of distilled-water reservoir, or up to the pressure of water conditioner, even if it is directly connected to the water distribution system.

The increase of pressure inside the chamber increases, in the first place, the tightness, initially produced by the gravity only; furthermore, no there is no risk of deactivation, and a pressure high enough to cause the filling-up water to rapidly flow from one to another cell is ensured.

Thus, with the plug according to the present invention, the electrolyte level inside the storage battery and the water level inside the filling-up device, as referred to each other, do not have any mutual influence, there is no risk of poor tightness due to the interaction of small pins and rigid bodies, nor the danger exists that small deposits may hinder the tightness, or that jamming may occurs, because all sliding plastic surfaces are in mutual contact along narrow generatrices only, because both the float stem and the lateral rod are provided with outer toothings to allow the respective flow of water and gases. Finally, the link of the stem and of the rod by the rocker lever nearly zeroes the inertia of the system.

Inside the plug of the present invention, the explosionpreventing power can be ensured by providing a hydrophobic porous cylindrical sleeve on the upper portion of the hollow stem of the float, from which the gases escape to the outside.

BRIEF DESCRIPTION OF THE DRAWINGS

For the purpose of better understanding the present invention, the invention is described herein below in detail, with reference to drawings, representing a preferred illustrative and not limitative form of practical embodiment wherein.

DESCRIPTION OF THE PREFERRED EMBODIMENTS

Figure 1:
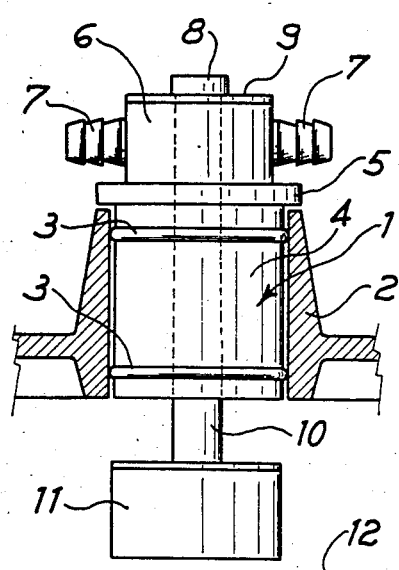
FIG. 1 is a perspective side view of the centralized selflevelling plug of the present invention, in its position of feed opening.
Figure 2:
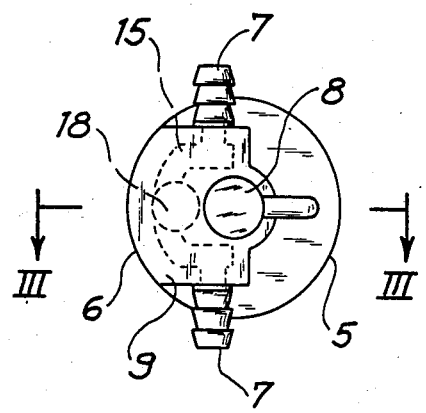
FIG. 2 is the schematic top view of the plug of FIG. 1.
Figure 3:
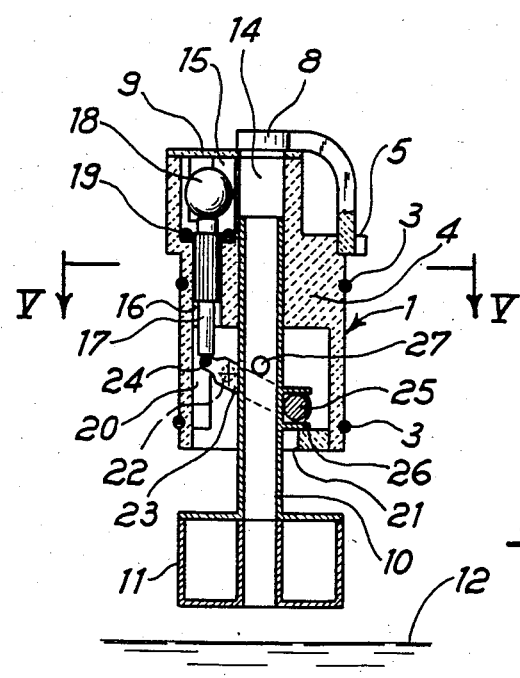
FIG. 3 is the elevation meridian view of the plug of FIGS. 1 and 2, obtained by a plane passing along the line III—III of FIG. 2.

Referring to FIGS. 1-5, the plug for centralized selflevelling 1 of the present invention is fastened onto the vent stack 2 of a cover by means of one or more sealing elastic ring(s) 3, of O-ring type, provided along the outer surface of the cylindrical body 4, having in its upper portion a stop ring 5.

The coupling between the vent stack 2 and the plug 1 can also be of the traditional bayonet type, or it can be provided by a thread or by simple pressure, even if the coupling by the sealing rings permits to obtain the advantage of an easy mutual orientation of the plugs of the various cells, which makes it easier to design the layout of the feed pipe of the water system, independently from the layout of the electrical circuit connection. On the upper portion of the stop ring 5, the plug 1 is provided with a feed body 6 with chambers for communication with the outside, connected to the water feed pipe 7. The feed body 6 is closed at the top by a cover 9. The feed body 6 and the cylindrical body 4 are hollow in their central portion, so as to form a through-duct 14, inside which a hollow stem 10 slides. The duct 14 is closed at its upper end by a cover 8, elastically positioned on cover 9.

The stem 10 protrudes from the lower base of the cylindrical body 4, and its end is affixed to a hollow float 11, having a central through-bore which is in communication with the inner cavity of stem 10. The float 11 floats above the surface of electrolyte 12.

Inside the cavities of the stem 10 and of the float 11, sensors or means for electrolyte check, such as densimeter, thermometer, etc., can be inserted.

The feed body 6 or at least its upper portion is preferably transparent and colourless (as if it were made, e.g., from polycarbonate), so that the position of the stem 10, preferably made from coloured or coloured and phosphorescent material, can be seen.

Laterally to the central duct 14, inside which the hollow stem 10 of float 11 slides, there are provided: inside the body 6, a chamber 15 for water feed; and, inside the cylindrical body 4, a lateral duct 16, which places chamber 15 in communication with the inside of the storage battery cell.

Inside the lateral duct 16 a small rod 17 slides, which supports at one of its ends a small sphere 18, which slides, with clearance, inside the chamber 15, and rests on an elastic sealing gasket 19, provided around the edge of duct 16.

The sphere 18 can be made of stainless steel, and acts on the elastic ring 19; or it can be elastomer-coated, and acts on a rigid, possibly conical, seat.

In the lower portion of the body 4 and under the ducts 16 and 14 a chamber 20 is provided, inside which a rocker lever 23 is placed. Inside the lower portion of the chamber 20 an open ring 21 is slid, either with mechanical interference, or bound by an adhesive, which supports a pin 22 passing through its walls and turning inside them, which is the fulcrum of the lever of double rocker arm 23. At the ends of the rocker arm 23, the support rod 17 and the hollow stem 10 are articulated, the rod 17 by abutting in 24, and the stem 10 in 25, by means of an open slot 26, supported by the same hollow stem.

Figure 5:
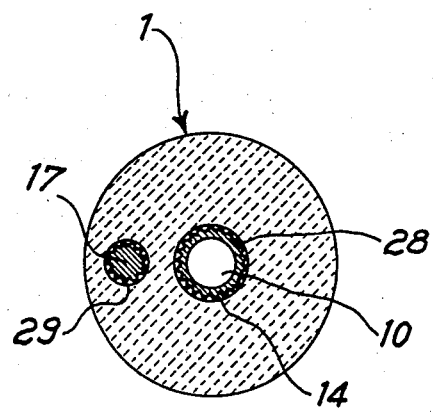
FIG. 5 is a horizontal sectional view of the plug of FIG. 3, according to the plane passing along the line V—V.

As it can be seen in FIG. 5, both the hollow stem 10 and the support rod 17 have their perimeters 28 and 29 provided with toothings, so as not to create continuous liquid diaphragms between their body and the surrounding walls, and to have the lowest possible sliding friction, at the same time allowing water and gases to freely flow. For greater safety and for the easy and safe ventilation of the cell, in the central portion of the hollow stem 10 a bore 27 is provided, which remains always open, whichever the position of stem 10 may be.

The plug 1 according to the present invention operates as follows: In the position when the plug has been connected at 7 to the filling-up water feed and discharge pipes, as in FIG. 3, the electrolyte 12 is at a too low level, the float 11 moves downwards until the open slot 26 stops against the bottom of the chamber housing the double rocker arm 20, driving downwards the end 25 of lever 23 and causing the opposite end 24 to move upwards, the opposite end 24 lifting the support rod 17 and spacing the sphere 18 apart from the sealing elastic element 19.

Figure 4:
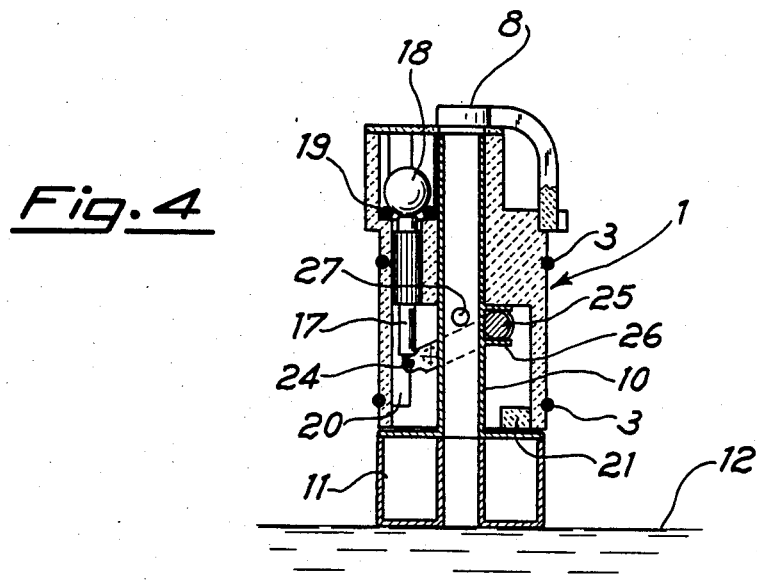
FIG. 4 shows the same section as of FIG. 3 in position of feed shutting.

Water flows through the ribs 29 inside the duct 16 and reaches the electrolyte 12. Electrolyte level rises and lifts the float 11 up to the condition as shown in FIG. 4, in which the open slot 26 stops against the upper wall of the chamber 20, driving downwards the pin 24 supporting the support rod 17. Under the action of gravity, the sphere 18 runs downwards, until it comes to rest against the sealing elastic ring 19. In this position, the sphere 18, no longer supported, starts weighing on ring 19, closing the access for feed water, so that inside chamber 15 pressure increases, causing water to flow through the discharge pipe 7 towards another adjacent cell, and securing a higher sealing pressure.

The present invention has been hereinabove described by referring to a plug for centralized self-levelling with free vent of gases.

More advantageously, the invention can be also applied to a plug for centralized self-levelling with an explosion-preventing device, i.e. capable of preventing transmission to the inner chamber of the cell the ignition of the gases which may have occured outside it, due to any reason.

Figure 6:
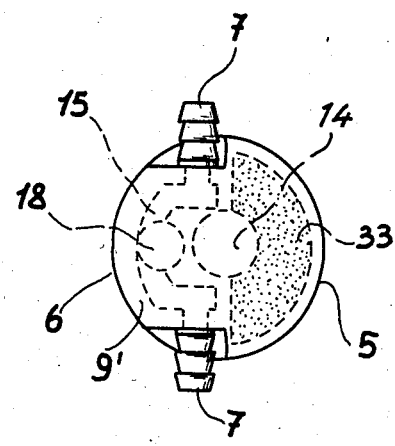
FIG. 6 represents the same view as of FIG. 2, of a plug provided at its upper end with a hydrophobic microporous cylindrical sleeve.
Figure 7:
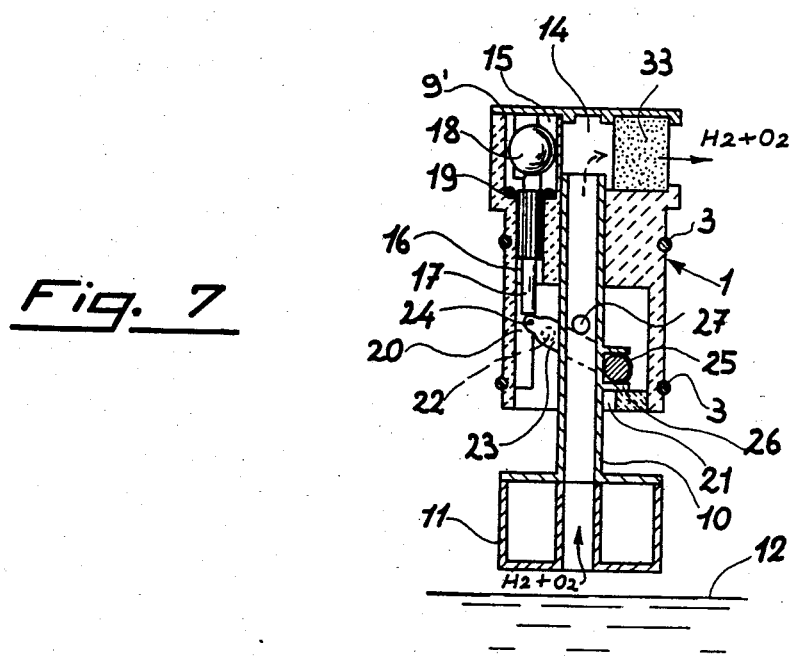
FIG. 7 represents the same section as of FIG. 3 of the plug of FIG. 6.

According to this latter embodiment, and as shown in FIGS. 6 and 7, the upper portion of the duct 14, above the upper end of the stem 10, is completely closed by a cover 9' extending throughout the plug surface; and is laterally closed by a cylindrical sleeve of hydrophobic microporous ceramic 33. This cylindrical sleeve 33 does not absorb the condensate of the liquids transported by entrainment by hydrogen and oxygen gases, but, should these catch fire, outside the cell, due to a sparking or to any other reasons, it prevents the ignition from propagating to the gases retained by the cell.

This represents a very important intrinsic safety for the electrical storage battery and above all for personnel using it or attending to it.

What we claim is:

1. A plug for cells of electrical storage batteries with centralized in-series self-levelling of the electrolyte, which comprises:
   a cylindrical body fastened to the vent stack of a cover, and provided with water feed and discharge pipes;
   a first central longitudinal duct through said cylindrical body;
   a water feed chamber provided laterally of said central duct;
   a second lateral duct parallel to the first duct, placing said feed chamber in communication with the electrolyte;
   a hollow stem, affixed at one end thereof to a hollow float, sliding in the interior of the central duct;
   a rod sliding in the interior of the lateral duct;
   a sphere supported by said rod and sliding in the interior of the water feed chamber, and
   a rocker element linking the hollow stem to the lateral rod, so that to the moving downwards of the stem, the moving upwards of the rod corresponds, and vice-versa.

2. A plug according to claim 1, wherein the rocker element comprises a two-arms lever, centrally articulated in the interior of the cylindrical body, and resting, at one of its ends, on the sphere-supporting rod, and, at its opposite end, articulated in the interior of an open slot within the body of the hollow stem, whereby the moving downwards of the float causes the moving upwards of the sphere, and the opening of the second lateral duct towards the electrolyte; and, the moving upwards of the float causes the sphere to move downwards, against the sealing ring, shutting the second lateral duct due to gravity and pressure.

3. Plug according to claim 1, wherein the hollow stem and the sphere-supporting rod have their side surface provided with toothings, to keep free the ducts for the flow of respectively gases and water, and to minimize the sliding friction and the tension due to the laminar adhesion to the duct walls.

4. Plug according to claim 1, wherein the cylindrical body is fastened to the vent stack of the cover by means of one or more circular elastic sealing ring.

5. Plug according to claim 1, wherein the upper portion of the cylindrical body is transparent and the hollow stem is coloured phosphorescent, whereby the electrolyte level may be seen.

6. Plug according to claim 1, wherein the cylindrical body is closed at its upper end by a cover, and the central duct is closed at its upper end by an elastically positioned cover.

7. Plug according to claim 1, wherein the upper portion of the central duct, above the head of the stem, is completely closed by a cover extending throughout the surface, and is bounded laterally by a cylindrical sleeve of hydrophobic microporous ceramic.

8. Plug according to claim 1, wherein in the lower portion of the cylindrical body an open ring is placed, which supports a pin on which the lever of the rocker element is hinged.

9. Plug according to claims 1, wherein inside the hollow of the stem means are provided for electrolyte check.

10. Plug according to claim 1, wherein the hollow stem is provided with a bore in its central portion.

* * * * *